(12) United States Patent
Hartmann et al.

(10) Patent No.: US 8,457,898 B2
(45) Date of Patent: Jun. 4, 2013

(54) SYSTEM AND METHOD FOR REAL-TIME QUALITY CONTROL FOR DOWNHOLE LOGGING DEVICES

(75) Inventors: Andreas Hartmann, Niedersachsen (DE); Oleg N. Akimov, Niedersachsen (DE); Ansgar Baule, Lower Saxony (DE); Christian Fulda, Lower Saxony (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/309,883

(22) Filed: Dec. 2, 2011

(65) Prior Publication Data

US 2012/0290206 A1 Nov. 15, 2012

Related U.S. Application Data

(63) Continuation of application No. 11/969,577, filed on Jan. 4, 2008, now Pat. No. 8,073,623.

(51) Int. Cl.
*G01V 3/38* (2006.01)

(52) U.S. Cl.
USPC .......... 702/9; 702/6; 175/38; 175/48; 175/66; 700/32; 700/83; 700/90; 166/250.01; 367/27

(58) Field of Classification Search
USPC ....... 702/6, 9; 175/38, 40, 48, 65, 66; 700/32, 700/83, 90; 166/250.01; 367/27
See application file for complete search history.

(56) References Cited

U.S. PATENT DOCUMENTS

| | | | |
|---|---|---|---|
| 6,282,452 B1 * | 8/2001 | DeGuzman et al. | 700/32 |
| 6,405,798 B1 * | 6/2002 | Barrett et al. | 166/250.01 |
| 6,446,718 B1 * | 9/2002 | Barrett et al. | 166/250.01 |
| 6,727,696 B2 * | 4/2004 | Kruspe et al. | 324/303 |
| 6,820,702 B2 * | 11/2004 | Niedermayr et al. | 175/57 |
| 6,845,819 B2 * | 1/2005 | Barrett et al. | 166/250.01 |
| 7,143,844 B2 * | 12/2006 | Alft et al. | 175/45 |
| 7,225,078 B2 * | 5/2007 | Shelley et al. | 702/13 |
| 7,242,194 B2 | 7/2007 | Hayman | |
| 7,350,597 B2 * | 4/2008 | Reitsma et al. | 175/66 |
| 7,395,878 B2 * | 7/2008 | Reitsma et al. | 175/38 |
| 2002/0096322 A1 * | 7/2002 | Barrett et al. | 166/250.01 |
| 2003/0118230 A1 * | 6/2003 | Song et al. | 382/152 |
| 2004/0040746 A1 * | 3/2004 | Niedermayr et al. | 175/38 |
| 2004/0153245 A1 | 8/2004 | Womer | |
| 2006/0092766 A1 * | 5/2006 | Shelley et al. | 367/72 |
| 2006/0285436 A1 * | 12/2006 | Mayorga Lopez et al. | 367/27 |
| 2007/0112521 A1 * | 5/2007 | Akimov et al. | 702/6 |
| 2007/0151763 A1 * | 7/2007 | Reitsma et al. | 175/48 |
| 2007/0289740 A1 * | 12/2007 | Thigpen et al. | 166/250.01 |

\* cited by examiner

*Primary Examiner* — Carol Tsai
(74) *Attorney, Agent, or Firm* — G. Michael Roebuck

(57) ABSTRACT

An illustrative embodiment of a method is disclosed for assessing image quality of a down hole formation image, the method comprising collecting acquisition system data from a plurality of sensors down hole; applying a set of rules to the acquisition system data to obtain an acquisition quality indicator; and presenting the acquisition quality indicator at a surface location. A system is disclosed for performing the method.

18 Claims, 9 Drawing Sheets

800

| Source | Diagnostic | Status |
|---|---|---|
| \[If a diagnostic question is answered by yes, the overall status will be set to the value defined in the column status\] | | |
| MPT | Work electrode powered? | 2 |
| MPT | Memory board status? | 2 |
| MPT | Communication with memory board bad? | 2 |
| MPT | Communication with imager board bad? | 2 |
| MPT | Magnetometer board bad? | 2 |
| MPT | Tool not sensing rotation? | 2 |
| MPT | EEPROM bad? | 2 |
| MPT | Tool memory full? | 1 |
| MPT | Guard current exceeds limits? | 1 |
| MPT | Magnetometer data bad? | 1 |
| MPT | Survey changes by more than 5°? | 1 |
| MPT | Drilling along magnetic field? | 1 |
| MPT | Fuse broken? | 2 |
| MPT, surface database | Surface and downhole directional information are not the same? | 1 |
| MPT, surface database | Is all required directional information available? | 1 |
| MPT channel | Is the mud pulse telemetry channel quality sufficient? | 2 |

| Input | Current image block data | — 1302 |
|---|---|---|
| Output | STK_QCDWORDX | |
| Category | STKImgX | |
| Time Est. | Done | |
| Software | StarTrak.exe | |
| Status | Needs testing | |
| Algorithm | • Count data words in the current image block<br>• Store and repeat this data for each image line | — 1304 |

| | Check error correction | — 1402 |
|---|---|---|
| Input | MPT data stream | |
| Output | Flag curve for storage, visual display | |
| Algorithm | • Determine amount of error correction currently used<br>• Flag if threshold is exceeded | — 1404 |

| Input | Current image block data | — 1502 |
|---|---|---|
| Output | STK_QCImgCountX | |
| Table | STKImgX | |
| Time Est. | Done | |
| Software | StarTrak.exe | |
| Status | Needs testing | |
| Algorithm | • After each image block, increment counter by one<br>• Store data to table, repeating the value for each image line until the next image block<br>• Reset counter to zero at power cycle, current implementation is to reset counter at program start | — 1504 |

*FIG. 15*

SYSTEM AND METHOD FOR REAL-TIME QUALITY CONTROL FOR DOWNHOLE LOGGING DEVICES

CROSS REFERENCE TO RELATED APPLICATIONS

This patent application is a continuation of U.S. patent application Ser. No. 11/969,577 filed on Jan. 04, 2008 now U.S. Pat. No. 8,073,623 entitled A SYSTEM AND METHOD REAL-TIME QUALITY CONTROL OF DOWNHOLE LOGGING DEVICES by Andreas Hartmann, Oleg N. Akimov, Ansgar Baule and Christian Fulda, which is hereby incorporated by reference in its entirety.

BACKGROUND FIELD OF THE INVENTION

The invention generally relates to formation logging.

BACKGROUND OF THE RELATED ART

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to instrumentation inside the sonde. The cable also provides communication channels for sending information in the form of data up to the surface. Thus, it is possible to measure some parameter of the earth's formations as a function of depth, that is, while the sonde is being pulled uphole through the borehole. Such "wireline" measurements are normally done in real time (however, these measurements are taken long after the actual drilling of the borehole has taken place).

A wireline sonde usually transmits energy into the formation surrounding the borehole as well acting as a suitable receiver for detecting the same energy returning from the formation to provide acquisition of a parameter of interest. As is well known in this art, these parameters of interest include but are not limited to electrical resistivity, acoustic energy, or nuclear measurements which directly or indirectly give information on subsurface densities, reflectances, boundaries, fluids and lithologies among many others.

Wireline formation evaluation tools (such as gamma ray density tools) have many drawbacks and disadvantages including loss of drilling time, the expense and delay involved in tripping the drillstring so as to enable the wireline tool to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling (MWD) either partly or totally eliminates the necessity of interrupting the drilling operation to remove the drillstring from the hole in order to make the necessary measurements obtainable by wireline techniques. In addition to the ability to log the characteristics of the formation through which the drill bit is passing, this information on a real time basis provides substantial safety and logistical advantages over wireline techniques for the drilling operation. One potential problem with MWD logging tools is that the measurements are typically made while the tool is rotating. Since the measurements are made shortly after the drill bit has drilled the borehole, washouts are less of a problem than in wireline logging. Nevertheless, there can be some variations in the spacing between the logging tool and the borehole wall ("standoff") with azimuth. Nuclear measurements are particularly degraded by large standoffs due to the scattering produced by borehole fluids between the tool and the formation.

U.S. Pat. No. 5,397,893 to Minette, the contents of which are fully incorporated herein by reference, teaches a method for analyzing data from a MWD formation evaluation logging tool which compensates for rotation of the logging tool (along with the rest of the drillstring) during measurement periods. The density measurement is combined with the measurement from a borehole caliper, preferably an acoustic caliper. The acoustic caliper continuously measures the standoff as the tool is rotating around the borehole. If the caliper is aligned with the density source and detectors, this gives a determination of the standoff in front of the detectors at any given time. This information is used to separate the density data into a number of bins based on the amount of standoff. After a pre-set time interval, the density measurement can then be made. The first step in this process is for short space (SS) and long space (LS) densities to be calculated from the data in each bin. Then, these density measurements are combined in a manner that minimizes the total error in the density calculation. This correction is applied using the "spine and ribs" algorithm to give a corrected density.

U.S. Pat. No. 6,584,837 to Kurkoski, fully incorporated by reference herein, discloses a LWD density sensor that includes a gamma ray source and at least two NaI detectors spaced apart from the source for determining measurements indicative of the formation density. A magnetometer on the drill collar measures the relative azimuth of the NaI detectors. An acoustic caliper is used for making standoff measurements of the NaI detectors. Measurements made by the detectors are partitioned into spatial bins defined by standoff and azimuth. Within each azimuthal sector, the density measurements are compensated for standoff, to provide a single density measurement for the sector. The azimuthal sectors are combined in such a way as to provide a compensated azimuthal geosteering density. The method of the invention may also be used with neutron porosity logging devices.

MWD instruments, in some cases, include a provision for sending at least some of the subsurface images and measurements acquired to recording equipment at the earth's surface at the time the measurements are made using a telemetry system (i.e. MWD telemetry). One such telemetry system modulates the pressure of a drilling fluid pumped through the drilling assembly to drill the wellbore. The fluid pressure modulation telemetry systems known in the art, however, are limited to transmitting data at a rate of at most only a few bits per second. Because the volume of data measured by the typical image-generating well logging instrument is relatively large, at present, borehole images after an MWD instrument is removed from the wellbore and the contents of an internal storage device, or memory, are retrieved, or in lower resolution while drilling. The images are available in real time and thus real time quality control is provided in an illustrative embodiment.

Many types of well logging instruments have been adapted to make measurements which can be converted into a visual representation or "image" of the wall of a wellbore drilled through earth formations. Typical instruments for developing images of parameters of interest measurements include density measuring devices, electrical resistivity measuring devices, gamma images and acoustic reflectance/travel time measuring devices. These instruments measure a property of the earth formations proximate to the wall of the wellbore, or a related property, with respect to azimuthal direction, about a substantial portion of the circumference of the wellbore. The values of the property measured are correlated to both their depth position in the wellbore and to their azimuthal position with respect to some selected reference, such as geographic north or the gravitationally uppermost side of the wellbore. A visual representation is then developed by presenting the values, with respect to their depths and azimuthal orientations, for instance, using a color or gray tone which corresponds to the value of the measured property.

SUMMARY

An illustrative embodiment of a method is disclosed for assessing data quality of a down hole formation image, the method comprising collecting data from a plurality of sensors down hole and on the surface; applying a set of rules to the acquired data to obtain an acquisition system quality indicator; and presenting the indicator at a surface location. A system is disclosed for performing the method in real time.

BRIEF DESCRIPTION OF THE DRAWINGS

The illustrative embodiment and its advantages will be better understood by referring to the following detailed description and the attached drawings in which:

FIG. 6-FIG. 15 are depictions of data structures embedded in a computer readable medium containing data indicative of information useful in performing the method and system of an illustrative embodiment.

DETAILED DESCRIPTION OF ILLUSTRATIVE EMBODIMENTS

Figure 1:
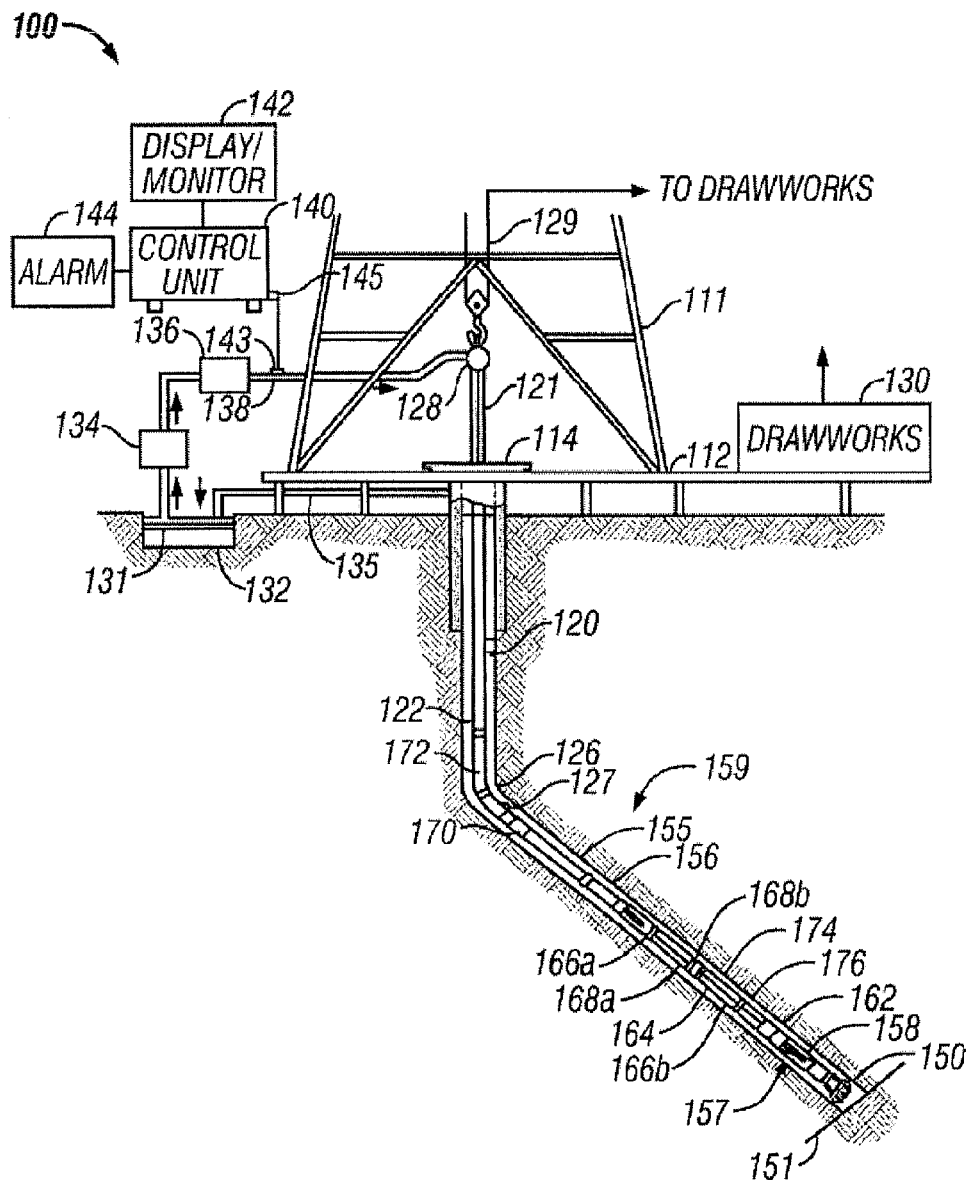
FIG. 1 shows a schematic diagram of a drilling system having a drill string that includes an apparatus according to the illustrative embodiment.

One method for transmitting image-generating measurements in pressure modulation telemetry includes making resistivity measurements at pre-selected azimuthal orientations or azimuthal orientation intervals, and transmitting the acquired resistivity values to the surface through the pressure modulation telemetry.

In an illustrative embodiment, a method and system are disclosed for assessing data quality of a down hole device, such as a down hole formation logging tool, formation imaging tool or formation evaluation tool. The method comprising collecting imaging system data and logging system data from a plurality of sensors down hole and up hole; applying a set of rules to the imaging system data to obtain an image quality indicator; and presenting the image quality indicator at the surface location. In another embodiment the method further comprises providing corrective action to adjust the data acquisition system indicated by the acquisition quality indicator. In another embodiment of the method, the image system data further comprises electronic sensor data indicating at least two items selected from the group consisting of downhole tool status, formation property, telemetry quality, bit position, and survey quality. In another embodiment of the method, the rules are contained in an expert system. In another embodiment of the method, the rules are contained in a neural network. In another embodiment inputs are processed by a software agent implementing an evaluation of the inputs to determine data quality using Bayesian statistics, principal components, fuzzy logic, etc.

In another embodiment of the method, the set of rules is formed from an initial training set of inputs and outputs, the method further comprising creating new rules by machine learning by tracking formation evaluation data, logging data, imaging system data and field service engineer corrective actions during operations. In another embodiment of the method, the imaging system data are dynamically weighted based on the rules. In another embodiment of the method, the image quality indicator is set to normal, which in a particular embodiment is indicated by a value of 0, when a down hole tool shows a guard electrode current for a guard electrode which exceeds a defined limit and a formation resistivity data value indicates low resistivity in the formation else the image quality indicator is set to alert, which in a particular embodiment is indicated by a 2, which when the down hole tool shows a current which exceeds a defined limit and the resistivity data value does not indicate low resistivity.

In another embodiment a system for assessing data quality of a down hole formation logging tool is disclosed, the system comprising a processor in data communication with a computer readable medium; and a computer program stored in the computer readable medium, the computer program comprising instructions to collect acquisition system data from a plurality of sensors on a downhole device, such as a formation evaluation tool, down hole in a formation and uphole at a surface location; instructions to apply a set of rules to system data to obtain an acquisition quality indicator; and instructions to present the acquisition quality indicator at the surface location. In another embodiment of the system, the computer program further comprising instructions to provide corrective action to adjust system and image quality indicated by the acquisition quality indicator. In another embodiment of the system the acquisition system data further comprises electronic sensor data indicating at least two items of data selected from the group consisting of downhole tool status data, formation property data, telemetry quality data, bit position data, and survey quality data. In another embodiment of the system the rules are contained in an expert system. In another embodiment of the system the rules are contained in a neural network. In another embodiment of the system the set of rules is formed from an initial training set of inputs and outputs, the computer program further comprising instructions to create new rules using machine learning by tracking acquisition system data and field service engineer corrective actions during imaging operations. In another embodiment of the system the acquisition system data are dynamically weighted based on the rules. In another embodiment of the system the acquisition quality indicator is set to normal when a down hole tool shows a current which exceeds a defined limit and a formation resistivity data value indicates low resistivity in a formation else the acquisition quality indicator is set to alert when the down hole tool shows a current which exceeds a defined limit and the resistivity data value does not indicate low resistivity.

FIG. 1 shows a schematic diagram of a drilling system 100 having a downhole assembly containing a sensor system and the surface devices according to one embodiment of present invention. As shown, the system 100 includes a conventional derrick 111 erected on a derrick floor 112 which supports a rotary table 114 that is rotated by a prime mover (not shown) at a desired rotational speed. A drill string 120 that includes a drill pipe section 122 extends downward from the rotary table 114 into a borehole 126. A drill bit 150 attached to the drill string downhole end disintegrates the geological formations when it is rotated. The drill string 120 is coupled to a drawworks 130 via a kelly joint 121, swivel 128 and line 129 through a system of pulleys 127. During the drilling operations, the drawworks 130 is operated to control the weight on bit and the rate of penetration of the drill string 120 into the borehole 126. The operation of the drawworks is well known in the art and is thus not described in detail herein.

During drilling operations a suitable drilling fluid (commonly referred to in the art as "mud") 131 from a mud pit 132 is circulated under pressure through the drill string 120 by a mud pump 134. The drilling fluid 131 passes from the mud pump 134 into the drill string 120 via a desurger 136, fluid line 138 and the kelly joint 121. The drilling fluid is discharged at the borehole bottom 151 through an opening in the drill bit 150. The drilling fluid circulates uphole through the annular space 127 between the drill string 120 and the borehole 126 and is discharged into the mud pit 132 via a return line 135. Preferably, a variety of sensors (not shown) are appropriately deployed on the surface according to known methods in the art to provide information about various drilling-related parameters, such as fluid flow rate, weight on bit, hook load, etc.

Figure 4:
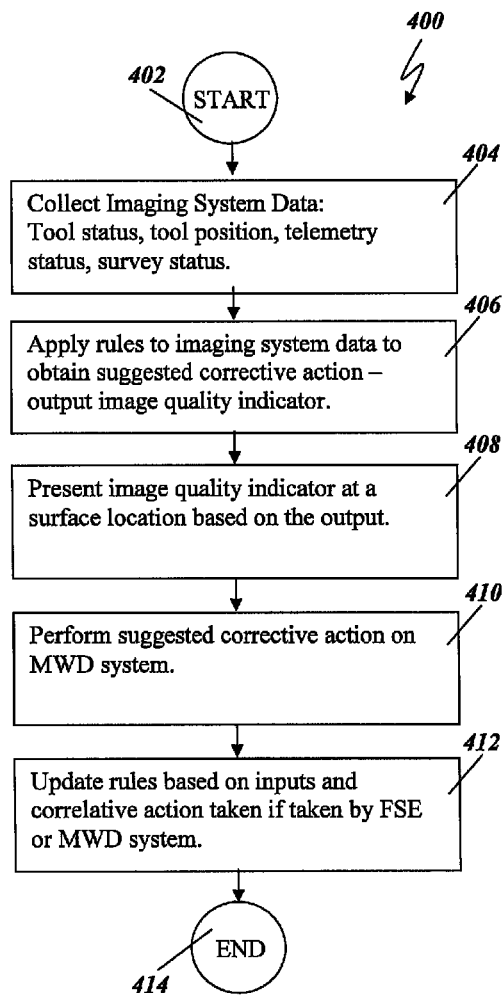
FIG. 4 is a flow chart illustrating operations of the illustrative embodiment.

A surface control unit 140 (which further includes an expert system or other software functionality such as an expert system or a neural network as shown in FIG. 4) receives signals from the downhole sensors and devices via a sensor 143 placed in the fluid line 138 and processes such signals according to programmed instructions provided to the surface control unit. The surface control unit displays desired drilling parameters and other information on a display/monitor 142 which information is utilized by an operator to control the drilling operations. The surface control unit 140 contains a computer, memory for storing data, data recorder and other peripherals. The surface control unit 140 also includes models and processes data according to programmed instructions and responds to user commands entered through a suitable means, such as a keyboard. The control unit 140 is preferably adapted to activate alarms 144 when certain unsafe or undesirable operating conditions occur.

In a particular embodiment, a drill motor or mud motor 155 coupled to the drill bit 150 via a drive shaft (not shown) disposed in a bearing assembly 157 rotates the drill bit 150 when the drilling fluid 131 is passed through the mud motor 155 under pressure. The bearing assembly 157 supports the radial and axial forces of the drill bit, the downthrust of the drill motor and the reactive upward loading from the applied weight on bit. A stabilizer 158 coupled to the bearing assembly 157 acts as a centralizer for the lowermost portion of the mud motor assembly.

In one embodiment of the system of present invention, the downhole subassembly 159 (also referred to as the bottom hole assembly or "BHA") which contains the various sensors and MWD devices to provide information about the formation and downhole drilling parameters and the mud motor, is coupled between the drill bit 150 and the drill pipe 122. The downhole assembly 159 preferably is modular in construction, in that the various devices are interconnected sections so that the individual sections may be replaced when desired.

Still referring to FIG. 1, the BHA also contains sensors and devices in addition to the above-described sensors. Such devices may include a device for measuring the formation resistivity near and/or in front of the drill bit, a gamma ray device for measuring the formation gamma ray intensity and devices for determining the inclination and azimuth of the drill string. The formation resistivity measuring device 164 may be coupled above the lower kick-off subassembly 162 that provides signals, from which resistivity of the formation near or in front of the drill bit 150 is determined. A multiple propagation resistivity device ("MPR") having one or more pairs of transmitting antennae 166a and 166b spaced from one or more pairs of receiving antennae 168a and 168b can be used. In operation, the transmitted electromagnetic waves are perturbed as they propagate through the formation surrounding the resistivity device 164. The receiving antennae 168a and 168b detect the perturbed waves. Formation resistivity can be derived from the phase and amplitude of the detected signals as well as the real and imaginary part of the signal. The detected signals are processed by a downhole circuit that is preferably placed in a housing 170 above the mud motor 155 and transmitted to the surface control unit 140 using a suitable telemetry system 172. In addition to or instead of the propagation resistivity device, a suitable induction logging device or any other resistivity measurement device may be used to measure formation resistivity.

The inclinometer 174 and gamma ray device 176 may be placed along the resistivity measuring device 164 for respectively determining the inclination of the portion of the drill string near the drill bit 150 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 155 transfers power to the drill bit 150 via one or more hollow shafts that run through the BHA. The hollow shaft enables the drilling fluid to pass from the mud motor 155 to the drill bit 150. In an alternate embodiment of the drill string 120, the mud motor 155 may be coupled below resistivity measuring device 164 or at any other suitable place.

The drill string contains a modular sensor assembly, a motor assembly and kick-off subs. In one embodiment, the sensor assembly may include a resistivity device, gamma ray device and inclinometer, all of which are in a common housing between the drill bit and the mud motor. The downhole assembly of the present invention may include a MWD section which contains a nuclear formation porosity measuring device, a nuclear density device, an acoustic sensor system placed, and a formation testing system above the mud motor 164 in the housing for providing information useful for evaluating and testing subsurface formations along borehole 126. A downhole processor may be used for processing the data.

Wireline logging tools have been used successfully to produce subsurface images. In an illustrative embodiment, for MWD applications, measurements made by the downhole sensors are sent to the surface using the telemetry system so that subsurface images and parameter determinations are available for real time applications such as geosteering. In an illustrative embodiment, measurements and system parameters sensed by the BHA are sent to the surface for real time evaluation by a software function such as an expert system for apprising the field service engineer (FSE) at the surface of ongoing operations. The software function, which may also be implemented in hardware, monitors outputs from the BHA and presents a status indicator to the FSE as to whether the MWD system is normal, cautionary or on alert. In an illustrative embodiment, the MWD system provides for acquiring formation parameters based on specific BHA sensors, i.e., from any one of a variety of formation evaluation sensors, including a resistivity sensor, a density sensor, a porosity sensor, a micro-resistivity imaging sensor, a borehole televiewer, a gamma ray sensor and/or a caliper (acoustic or mechanical).

Figure 2:
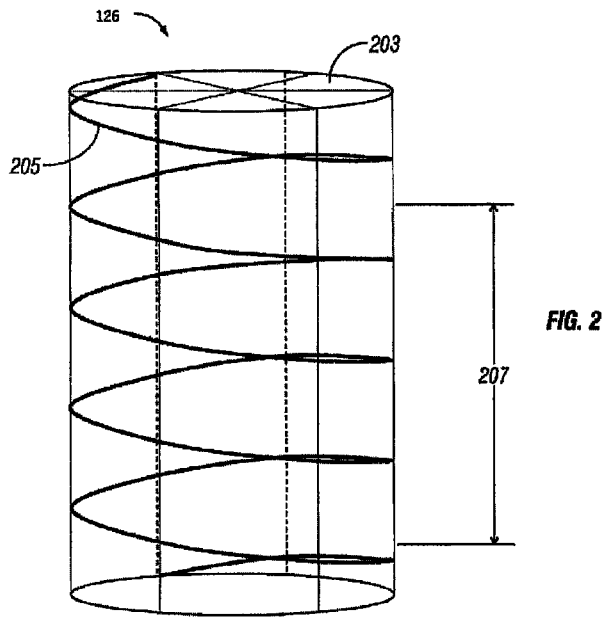
FIG. 2 illustrates the sensor path for data acquisition by a downhole imaging tool while drilling.

Turning now to FIG. 2, a borehole 126 is shown with six azimuthal sectors for simplicity. In an illustrative embodiment, the borehole is divided into 120 sectors of 3 degrees each for total of 360 degrees. One of the sectors is labeled as 203. As noted, the use of 120 sectors is not to be construed as a limitation of the invention and commonly, more or less sectors may be used. As drilling progresses, a sensor on the BHA that makes a measurement of a property of the borehole wall (or the adjacent formation) traces out a spiral path depicted by 205. The spiral path will have a uniform pitch if the rate of penetration (ROP) of the BHA into the formation is uniform. In practice, the ROP may not be uniform.

In an illustrative embodiment, an image comprises three measured quantities. The first is time or depth measured by an internal clock on the BHA which may be processed in conjunction with a suitable depth measurement system. The second is a tool face angle measured by a suitable orientation device such as a magnetometer or a gyroscope. The tool face angle can be referenced to magnetic north or to the high side of the tool or any other suitable reference point. The difference of the tool face angles referenced to magnetic north and to the high side of the tool depends on tool azimuth and inclination as well as on magnetic dip and can be measured separately or calculated from tool azimuth and inclination as well as magnetic dip measurements. Tool azimuth and inclination can be measured separately. In one embodiment of the invention, they are measured by the directional sonde of ONTRAK™, a trademark of Baker Hughes Incorporated. Magnetic dip can be measured at the surface or can be determined for instance by British Geological Survey Global Geomagnetic Model (BGGM). A third quantity defining the image is a formation property such as electrical resistivity, density, or porosity. The image itself consists of a matrix of formation evaluation measurements where row and column number of each matrix cell is characterized by time or depth and toolface angle, respectively. The penetration Δ L during one increment of the memory stamp $T_M$ is indicated in FIG. 2 by 207. In an illustrative embodiment, the BHA data is transmitted from the downhole location via the telemetry system to the surface and then reconstruct the image. The transmission of the data is done using a suitable telemetry channel such as mud pulse telemetry channel 127. It should be noted that the BHA formation evaluation sensor do not have to make measurements during continued rotation of the BHA.

Figure 3:
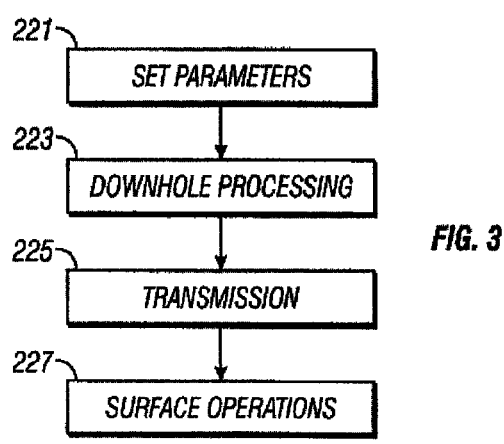
FIG. 3 is a flow chart illustrating the overall organization of an illustrative embodiment.

Turning now to FIG. 3, a flow chart illustrates the overall sequence of operations for the present invention applied to an imaging system. At block 221, the real-time imaging parameters are set. Block 223 refers to the downhole operations. Block 225 broadly refers to operations relating to the transmission of the data from the downhole location to the surface location, and block 227 refers to operations at the surface. These broad categories are discussed next.

The set of parameters 221 determine the quality of the image received in real-time. Programming the tool can be done while the tool is on surface or via downlink while the tool is downhole. The real time preset imaging parameters which are provided to the tool can include, but are not limited to: (i) the number of rows and columns of the image; (ii) the time resolution : this is the time covered by one single data row; (iii) the number of bits per pixel which is the number of bits with which the measured formation evaluation values will be discretized (iv) the number of telemetry words per time frame for one image block (v) the scaling method to be used; and (vi) the method of data block creation. The parameters listed above are not meant to be inclusive, and in principle, there are other parameter sets possible which are related to the parameters in the list above.

The present invention also includes a mud pulse telemetry channel 172 between the BHA and the surface control unit 140, which provides the ability to alter at least a subset of the preset imaging parameters. With this technique, it is possible to change the options for real-time imaging such as resolutions in time, tool face angle and resistivity. These options are defined by the set of imaging parameters. The imaging parameters can be changed while the drilling process is ongoing. This can be very helpful for geosteering applications. Resetting of parameters can be done manually via downlinks or automatically when the measured data fulfill specific conditions based on application of rules stored in the database 127 at the control unit 140. For example, this may be done at regular time intervals, at regular depth intervals, when specific predefined depth is attained, when measured formation evaluation values show significant variation and/or when dips are found by automatic dip detection algorithms as known in the art. The options for real-time transmission can also be controlled by other formation evaluation measurement tools, e.g. bulk measurement tools.

Turning now to FIG. 4, in an illustrative embodiment, a set of functions is performed as shown in FIG. 4. The order of execution in the flow chart of FIG. 4 is not dictated by FIG. 4 as any function shown in FIG. 4 can be executed in any order with respect to the other functions in FIG. 4 as well as any function can be left out of execution altogether.

As shown in FIG. 4, in flow chart 400 an illustrative embodiment at block 404 collects imaging system data (including but not limited to data sent from the BHA to the surface via telemetry channel 172, or from up hole data sources) including but not limited to tool status, tool position, telemetry system status and survey status. In block 406 an illustrative embodiment applies rules to the imaging system data to obtain a suggested corrective action and an imaging system quality indicator. The inputs which include but are not limited to the imaging system data, are applied to a rule-based expert system, a rule-based neural network or another rule-based software or hardware implementation that operates on the imaging system data by applying rules to obtain a suggested corrective action and an imaging system quality indicator. At block 408, an illustrative embodiment presents the imaging system quality indicator on a display at the surface. The imaging system quality indicator can be displayed at the surface as a color-coded vertical bar to indicate the status of the imaging system, as discussed herein. In another illustrative embodiment the rule-based system is trained by an operator action such as the FSE taking corrective action in adjusting or resetting the drilling system 100 based on the current inputs from the imaging system data. In another illustrative embodiment, the rule-based system performs the corrective action by adjusting the drilling system 100. Some examples of the corrective scenarios action based on imaging system data are discussed below. At block 410 an illustrative embodiment updates the rules based on the current imaging system data and the corrective action taken by the FSE or performed by the rule-based system itself.

Figure 5:
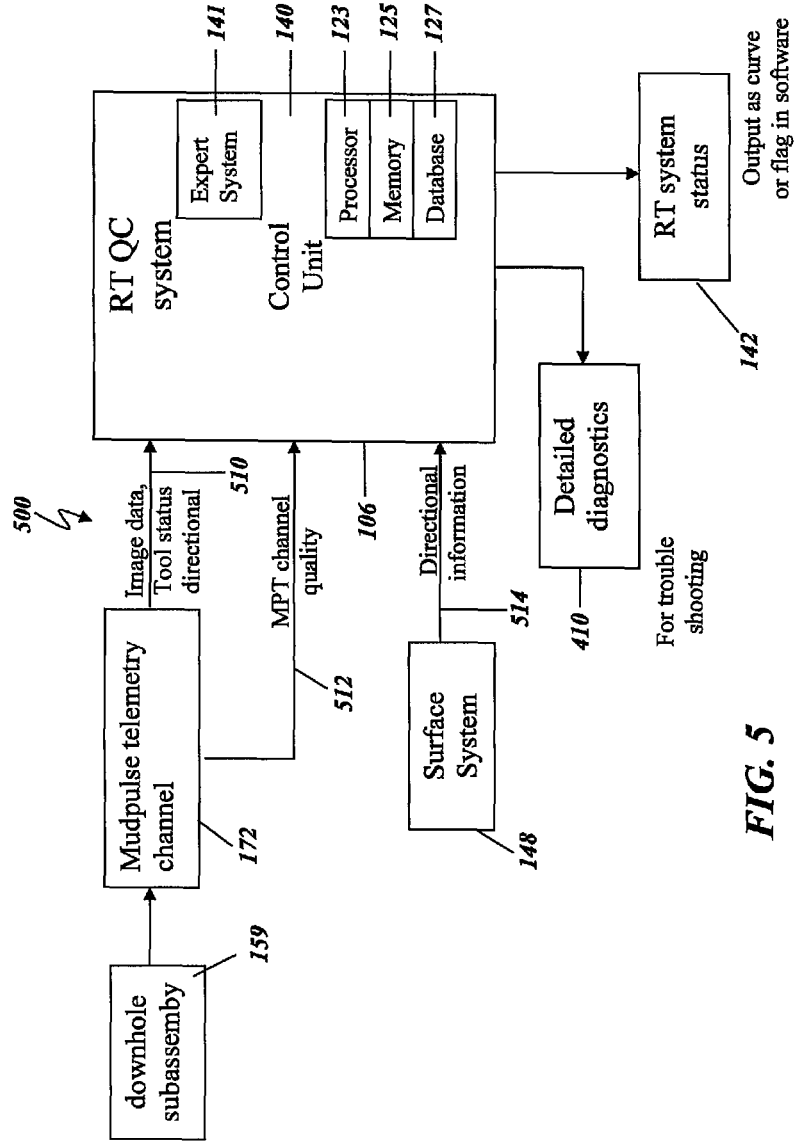
FIG. 5 is a schematic diagram of a drilling system having a drill string that includes an apparatus according to the illustrative embodiment.

Turning now to FIG. 5, FIG. 5 is a schematic diagram of a drilling system having a drill string that includes an apparatus according to the illustrative embodiment. In an illustrative embodiment, the BHA 159 sends imaging system data to the surface control unit 140 via the mud pulse telemetry channel 172. In an illustrative embodiment, real time quality control of formation image data is performed using an expert system, neural network or another rule-based control and analysis software on the surface in the control unit 140. The control unit further includes but is not limited to a processor 123, memory 125 and data base 127. The memory is a computer readable medium containing instructions that when executed by a computer are useful in performing function of the system and method of an illustrative embodiment. The BHA transmits imaging system data, tool status and directional data 510 as well as data indicating the quality of data transmission over the mud pulse telemetry channel 172.

The quality of imaging system data processed by the expert system is indicated by the transmitted real-time data 510. Quality depends on several factors evaluated by the expert system. One factor input to the expert system is downhole tool status. Downhole tool problems can be categorized as either critical, e.g., complete image loss, or non-critical, by the expert system rules. For example, the downhole tool might choose to recover from a failure or suboptimal status indicator for which failure does not overly impair formation image quality. A second factor is the quality of the survey information that will directly influence image orientation and therefore any image interpretation based on the imaging data. The magnitude of the down hole tool problem determines whether it can be accepted or not. A third factor is the quality of the telemetry channel. Low bandwidth or failure of the telemetry will result in loss of image data or low quality images.

Figure 6:
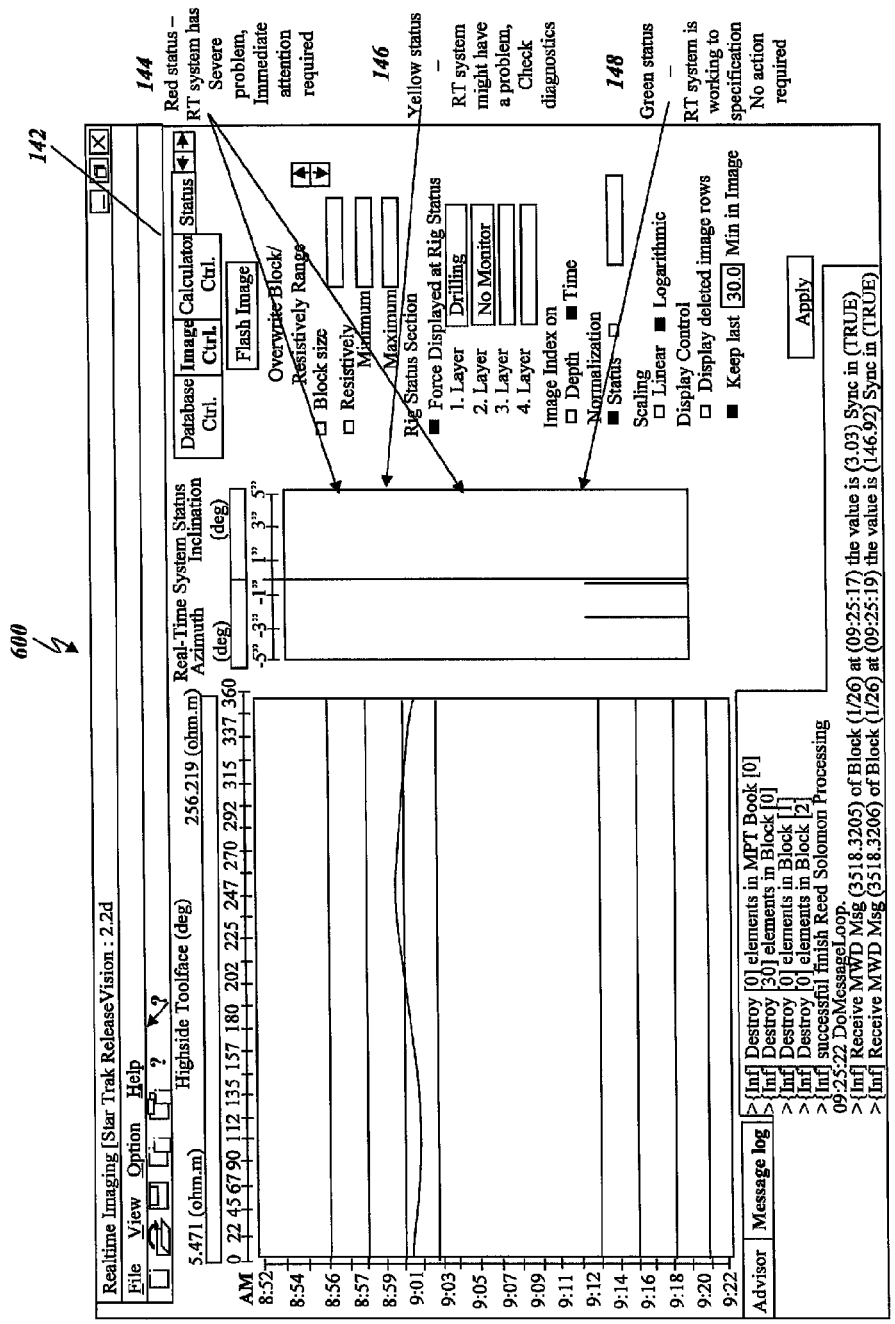

The surface system 148 or a down hole system sends directional data to the control unit 140. The control system further provides detailed diagnostics 401 for testing the drilling system, the BHA and the ability of the BHA to perform imaging at an acceptable quality. The real time system status is displayed on display 142 to the FSE. As shown in FIG. 6, the status can be displayed on the right side of the real time system status display 142 as a single, color coded bar as red 144, yellow 146, or green 148. When clicking with the mouse on that bar, additional information such as a suggested or pending expert system corrective action is provided as pop-up or in a text display. The quality control data will also be made available on the database for display.

This following data structures shown in FIG. 7-FIG. 15 are illustrations of data structures embedded in computer readable memory that contain data used by the expert system to assess imaging system quality and further demonstrate that the status is not only dependent on the tool status, but also on a number of different variables that are monitored periodically or continuously and/or simultaneously in order to get the optimum image quality. To simplify this task for the FSE, a real-time quality control expert system was developed that monitors all relevant data sources and analyses them in order to determine the overall system status.

Figure 7:
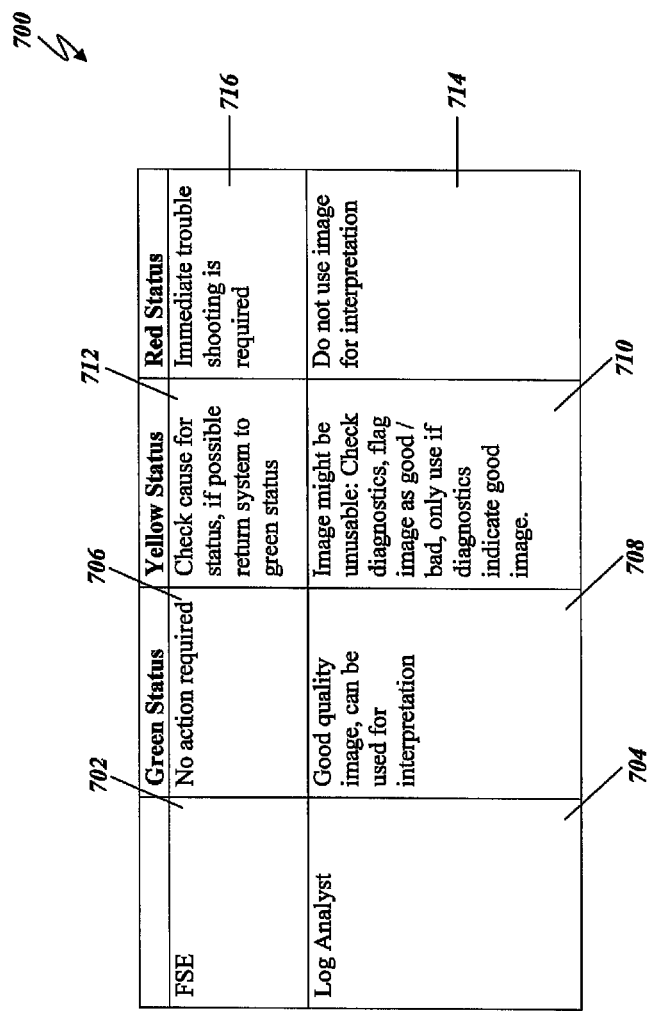

Turning now to FIG. 7, in an illustrative embodiment, as shown in FIG. 7, the real-time system display 142 will display one of three states, normal, caution and alert. A normal or green status indicator indicates that all diagnostics are good, image quality is as expected. A caution or yellow status indicator indicates that some non-critical diagnostics are set, image might be affected. An alert or red status indicator indicates that real-time system status is critical, no/bad image acquired. As shown i FIG. 7, there are appropriate actions to be taken by the FSE running the real-time MWD system and the log analyst interpreting the image from the MWD system. If the status displayed on real time display 142 is green 706, no action is needed by the field service engineer (FSE) 702 and the log analyst 704 is assured that there is good image quality that can be used for interpretation 706. If the status displayed on real time display 142 is yellow, the FSE should check the cause of the yellow caution from the system status 712 and if possible, return the system to green status. The log analyst is apprised that the image might be unusable and suggested or pending corrective action such as checking diagnostics, flagging the image as good or bad, and only to be used if the diagnostics indicate that the image is good 710. If the system status displayed on real time display 142 is an alarm or red status the FSE should perform immediate trouble shooting 716 and the log analyst is informed that the image should not be used for interpretation 714. In an illustrative embodiment corrective action is suggested via display 142 or performed by the expert system or neural network. In another illustrative embodiment a script of correction actions in output executed by the expert system or FSE.

Turning now to FIG. 8, the system status 800 is recorded as data stored in the data structure embedded in a computer readable medium for storing data indicative of the system status. The system status, quality indicator and input data can be adjusted or weighted based on the rules, for example, a system status of 1 can weighted adjusted to a status of 0 or 2 based on an application of the rules to the input data. For example, in a particular illustrative embodiment, if sensor is powered 802 the status is set to 2 804 pending further review and application of the rules on the status data by the expert system; and if the guard current powering a guard electrode on the down hole tool thereby sending an electromagnetic field into the formation, exceeds a predefined limit 806, the status is set to 1, pending further review by and application of the rules on the status data by the expert system. The system status is computed from several diagnostics with values 0-2 (0—green, 1—yellow, 2—red), the value used is always the worst of all the input parameters (i.e., Imaging Quality Control Status (IQCS)=max (status 1, status 2, . . . , status N). The table below defines the diagnostics, provides corresponding status values, and the source. Some bits in status are assumed to be critical if they are zero, some if they are one however the expert system will consider other imaging system data inputs to choose a suitable status to display to the FSE on the real time display 172. The following sections define the sources for the diagnostics above and how they are derived.

Figure 9:
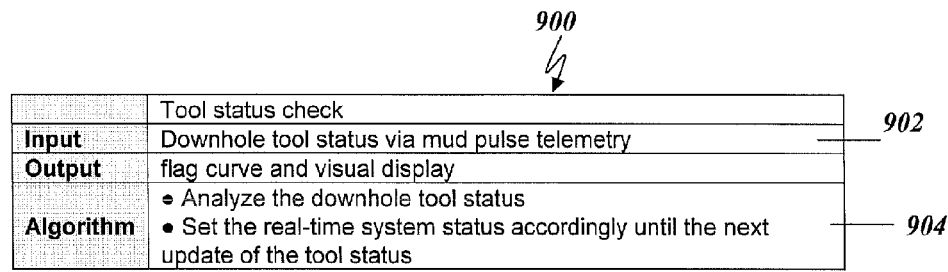

As shown in FIG. 9, the tool status is derived from the application of a set of rules applied to the tool status values and other system data inputs and stored in data structure 900. The tool status includes downhole tool status via mud pulse telemetry 902. As shown in FIG. 9, based on the data in the data structure 900, an illustrative embodiment sets the real-time system status repeatedly use the latest value of IQCS, until new value is determined by the expert system from the imaging and logging system data transmitted from the BHA 904.

Figure 10:
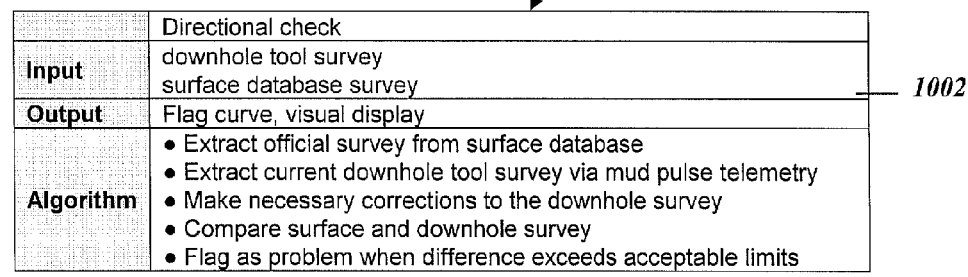

As shown in FIG. 10, data structure 1000 contains data that indicates when a new directional information 1002 from downhole from the surface system, the control unit 140 expert system 141 corrects down hole tool azimuth 1004 using magnetic to grid correction, subtracts surface system azimuth from corrected DIT azimuth, subtracts surface system inclination from DIT inclination, takes absolute values of inclination and azimuth difference, and if one of the absolute values is more than predefined limit, sets defined status bit as 1, else sets defined status bit as 0. An illustrative embodiment uses this value of the status bit until new downhole survey data arrive. If no directional information from DIT or surface system surveys are present, the expert system stores missing values instead; does not display a curve; sets system status yellow; and displays a real time advisor message to suggest or perform corrective action to fix the problem.

Figure 11:
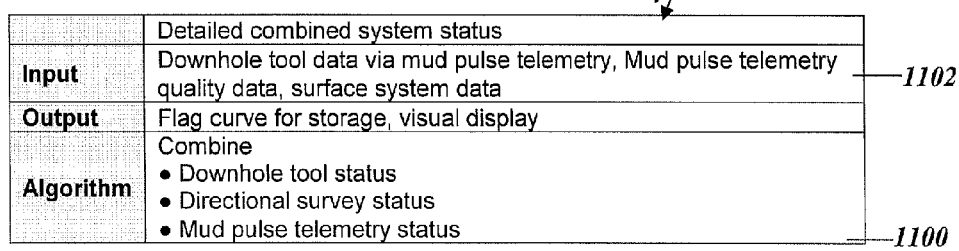

As shown in FIG. 11, the complete system status data structure 1100 contains data indicating flags provided by downhole tool status, directional survey status, and communication channel status. An illustrative embodiment presents a plot or hard copy output of data from the downhole tool, referred to as a curve. The curves outlined in the tables below provide details to the FSE regarding possible causes, to facilitate trouble shooting and corrective action, if system status is yellow or red. The curves also help a user make a detailed assessment of the image quality for interpretation/dip-picking when drilling system status is yellow. The data is stored in the database 127 and displayed.

Figure 12:
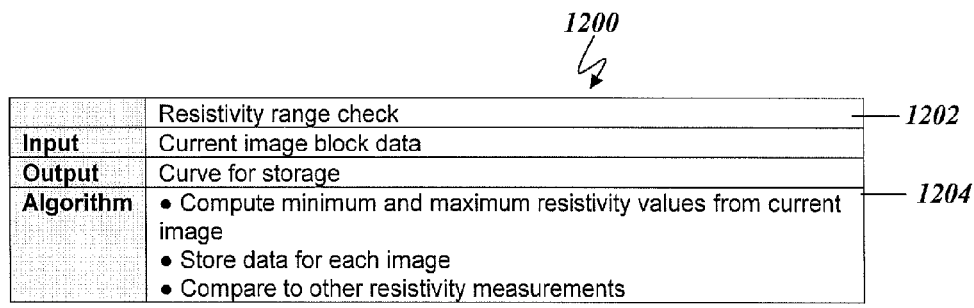

As shown in FIG. 12, data structure 1200 contains data indicating conditions that enables an illustrative embodiment to assess effects related to scaling differences of image frames an illustrative embodiment examines current image block data 1202, takes minimum/maximum scaling values 1204 from transmitted image header and stores this data for each image. In an illustrative embodiment this data is stored for each image and is compared to other resistivity measurements.

As shown in FIG. 13, data structure 1300 contains data indicating conditions that enables an illustrative embodiment to assess overall image quality by checking telemetry band width by counting data words transmitted for the current image 1302 and storing and displaying this data for each image line 1304. As shown in FIG. 14, data structure 1400 contains data indicating conditions that enables an illustrative embodiment to assess overall image quality, an illustrative embodiment stores the amount of error correction used for the current image. The data structure includes fields for mud pulse telemetry (MPT) data stream quality 1402 and field for storing data indicative of the amount of error correction currently used 1404 and a flag if a preset error correction threshold is exceeded.

In one illustrative scenario in which the real time imaging system associated with the MWD tool BHA is inoperative as the drill bit is picked up off the bottom of the borehole. In this case, the drill bit is picked up off the bottom of the borehole, and mud circulation in the borehole is interrupted. When mud circulation is resumed an invalid directional survey is taken by the directional tool and sent to the BHA which reports the directional data to the surface control system. The BHA uses the invalid directional survey data causing a rotated image error. In the present illustrative scenario, the real time quality control system 140 of the present illustrative embodiment monitors the directional data coming from the downhole tool through the telemetry channel and from surface data sources, and determines that there is a problem, thereby setting the real time quality control status to red or an alert indicator. The real time quality control system 140 also monitors other operational inputs from the imaging system and drilling system data, indicating for example, bit position. In an illustrative embodiment, the expert system of the real time quality control system applies rules to the inputs and takes corrective action to remedy the problem. In another illustrative embodiment, the expert system of the real time quality control system applies rules to the inputs and displays recommended corrective action to remedy the problem. In an illustrative embodiment, the corrective action taken or displayed as recommended is to cycle the mud pumps and initiate a new directional survey so that the directional tool sends valid directional survey data to the BHA which relays valid image data to the surface. The real time quality control status displayed on the display 142 is set to green, indicating normal. In another illustrative scenario, the real time quality control system expert system monitors the mud pulse telemetry quality data and determines that telemetry data transmission has been interrupted for 10 seconds. Thus the displayed image data is incorrect due to the data lost during the 10 second lapse in telemetry transmission and a red alert status is displayed by the real time quality control system expert system. Appropriate corrective action is taken or recommended by the real time quality control system expert system. In another illustrative scenario, the real time quality control expert system determines that the error correction in the telemetry channel is above an acceptable level, for example, above 10%.

Error correction algorithms are used including but not limited to Reed-Solomon error correction which is an error-correcting code that works by oversampling a polynomial constructed from the data. The polynomial is evaluated at several points, and these values are sent or recorded. By sampling the polynomial more often than is necessary, the polynomial is over-determined. As long as "many" of the points are received correctly, the receiver can recover the original polynomial even in the presence of a "few" bad points.

In an illustrative scenario, the real time quality control system sends commands to restructure data transmission over the telemetry channel reducing the data transmission rate and the size of the data packets sent over the telemetry channel. In an illustrative embodiment the BHA sends images including drilling system data to the real time quality control system from which the real time quality control system performs corrective action or suggests corrective action. The BHA data can include but is not limited to data indicative of real time status normal, real time status cautionary, real time status critical, azimuth, inclination, time, some additional bulk measurements from other MWD tools, downhole imaging tool power on, memory status, internal tool communication status, magnetic or high side tool face reference, magnetometer status, getting of the image information from full circumference of borehole, absence of free memory space, measurement ranges, mud pulse telemetry communication status, image's sector number, image's color depth, image counter, number of decoded words per image, error correction format.

In another particular illustrative embodiment, there are three main inputs. The first input data is made up of the data stream from the tool which contains the image data as well as diagnostic data, diagnostic data could be ranges of the measurement, hardware indicators, i.e. are all electronics working to specs, for instance memory or magnetometer electronics. The second set of input data is data from the mud pulse telemetry (MPT) system. The software analyzes the data stream with respect to its quality, i.e. are bits lost, how many bytes are transmitted per image, have any errors occurred that can be corrected. The third set of inputs is made up of data from the surface system, which is particularly the survey information, i.e. well inclination and well azimuth that is used. The system and method provide three system status levels, good, bad, and intermediate. When system status is good (green) no action required by FSE. When the system status is intermediate (yellow) there is a possible problem, on which the FSE should check. When the system status is red, or at an alert level where immediate corrective action is suggested, there is a system failure of the system, and immediate attention is suggested or required.

For every input from the down hole tool sent to the real time quality control system, including around 20 inputs in an illustrative system, a rule, threshold and a severity are defined for each input individually and a rule defined for each input in the context of every other input and input value. Corrective action is also suggested or provided by applying the inputs to the rules in the expert system for various values for each input. The severity is either intermediate or bad. In another particular embodiment, if one input crosses its threshold, the system state is set to the respective severity of the input. For example, if there are ten inputs below their thresholds, one input at intermediate severity and one that is bad, the overall state would be presumed bad pending adjustment of the state by application of the rules in the expert system or neural network.

Some of the rules operate on properties derived from imaging system data. For example, in a particular embodiment a survey problem is detected as follows 1. Take the directional information that is used downhole (azimuth and inclination)
2. Take the official directional information (residing in the database on surface)
3. Take the difference of the two directional surveys
4. Set system status to cautionary (yellow) if this difference is larger than 5°. In this case the system gets only a "cautionary" because an image with usable data is still being produced. If an error is detected the FSE or expert system "interacts" to determine the cause of the error. This can mean two things. 1. The FSE or expert system will look at the processing software (this software also contains the expert system) which shows all diagnostics and will display the cause. 2. The FSE or expert system creates a detailed diagnostic plot that will show the system status and the inputs. This allows an FSE or expert system to see how the MWD system evolved in time and when and how it failed. When the FSE or expert system determines the root cause of the error, corrective action is taken. This can mean several things:—Changing the parameters of the mud pulse telemetry, i.e. improving quality of the data stream—Changing the parameters in the real-time acquisition software, for instance to make it less susceptible to transmission errors—Advising driller or client to take a specific action, i.e. restarting the tool, ignore certain parts of the acquired image.

The foregoing example is for purposes of example only and is not intended to limit the scope of the invention which is defined by the following claims.

What is claimed is:

1. A method for assessing acquisition system status for a down hole device, the method comprising:
    collecting acquisition system data from a plurality of sensors down hole and up hole;
    applying a set of rules to the acquisition system data to obtain an acquisition quality indicator indicating quality of the acquisition data;
    presenting the acquisition quality indicator at a surface location wherein the set of rules is formed from an initial training set of inputs and outputs; and
    creating new rules by machine learning by tracking imaging system data and/or field service engineer corrective actions during imaging operations.

2. The method of claim 1, further comprising:
    providing corrective action to adjust the acquisition system as indicated by the acquisition quality indicator.

3. The method of claim 1, wherein the acquisition system data further comprises electronic sensor data indicating at least two items selected from the group consisting of downhole tool status, formation property, telemetry quality, bit position, and directional data.

4. The method of claim 1, wherein the rules are contained in an expert system.

5. The method of claim 1, wherein the rules are contained in a neural network.

6. The method of claim 1, wherein the acquisition system data are dynamically weighted based on the rules.

7. The method of claim 6, wherein the acquisition quality indicator is set to normal when a down hole tool shows a guard electrode current which exceeds a defined limit and a formation resistivity data value indicates low resistivity in the formation else the acquisition quality indicator is set to alert when the down hole tool shows the current which exceeds the defined limit and the resistivity data value does not indicate low formation resistivity.

8. A system for assessing acquisition system quality of a down hole formation evaluation system, the system comprising:
    a processor in data communication with a non-transitory computer readable medium;
    a computer program stored in the computer readable medium, the computer program comprising instructions to collect diagnostic system data from a plurality of sensors down hole; instructions to apply a set of rules to the acquisition system data to obtain an acquisition system quality indicator indicating quality of the acquisition data; and instructions to present the acquisition system quality indicator at a surface location, wherein the set of rules is formed from an initial training set of inputs and outputs; and
    instructions to create new rules by machine learning by tracking acquisition system data and field service engineer corrective actions during data acquisition operations.

9. The system of claim 8, the computer program further comprising instructions to provide corrective action to adjust the acquisition system quality indicated by the acquisition system quality indicator.

10. The system of claim 8, wherein the acquisition system data further comprises electronic sensor data indicating at least two items selected from the group consisting of downhole tool status, formation property, telemetry quality, bit position, and directional data.

11. The system of claim 8, wherein the rules are contained in an expert system.

12. The system of claim 8, wherein the rules are contained in a computer program selected from the group consisting of a neural network computer program and a frizzy logic computer program.

13. The system of claim 8, wherein the acquisition system data are dynamically weighted based on the rules.

14. The system of claim 13, wherein the image quality indicator is set to normal when a down hole tool shows a current consumption exceeding a limit and a formation resistivity data value indicates low resistivity in the formation else the data acquisition indicator is set to alert when the a down hole tool shows a current consumption exceeding a limit and the resistivity data value does not indicate low resistivity.

15. A method for assessing acquisition system status for a down hole device, the method comprising:
    collecting acquisition system data from a plurality of sensors down hole and up hole;
    applying a set of rules to the acquisition system data to obtain an acquisition quality indicator indicating quality of the acquisition data, wherein the set of rules is formed from an initial training set of inputs and outputs;
    creating new rules by machine learning by tracking imaging system data and/or field service engineer corrective actions during imaging operations wherein the set of rules is formed from an initial training set of inputs and outputs;

creating new rules by machine learning by tracking imaging system data and/or field service engineer corrective actions during imaging operations; and presenting the acquisition quality indicator at a surface location.

16. The method of claim 15 wherein the acquisition quality indicator is set to normal when a down hole tool shows a guard electrode current which exceeds a defined limit and a formation resistivity data value indicates low resistivity in the formation else the acquisition quality indicator is set to alert when the down hole tool shows the current which exceeds the defined limit and the resistivity data value does not indicate low formation resistivity.

17. A system for assessing acquisition system quality of a down hole formation evaluation system, the system comprising:

a processor in data communication with a non-transitory computer readable medium;

a computer program stored in the non-transitory computer readable medium for causing a computer to perform a method, the computer program comprising instructions to collect diagnostic system data from a plurality of sensors down hole; instructions to apply a set of rules to the acquisition system data to obtain an acquisition system quality indicator indicating quality of the acquisition data; and instructions to present the acquisition system quality indicator at a surface location, wherein the set of rules is formed from an initial training set of inputs and outputs, the computer program further comprising instructions to create new rules by machine learning by tracking acquisition system data and field service engineer corrective actions during data acquisition operations.

18. The system of claim 17, wherein the acquisition system data are dynamically weighted based on the rules.

* * * * *